United States Patent

[11] 3,568,683

[72] Inventors Ralph L. Sutton
 Rock Island;
 Lawrence L. Cornelius, Moline, Ill.
[21] Appl. No. 840,646
[22] Filed July 10, 1969
[45] Patented Mar. 9, 1971
[73] Assignee International Harvester Company
 Chicago, Ill.

[54] TRASH ROLLS FOR CORN HARVESTER
 10 Claims, 5 Drawing Figs.
[52] U.S. Cl.................................................. 130/30,
 56/18
[51] Int. Cl...................................................... A01d 45/02
[50] Field of Search............................................ 56/18, 103,
 104, 64; 130/30 (A), 5 (E)

[56] References Cited
 UNITED STATES PATENTS

| 1,188,084 | 6/1916 | Kreitzer | 130/5 |
| 2,315,950 | 4/1943 | Fitzloff | 130/5 |
| 2,515,808 | 7/1950 | Stoddard | 56/64 |
| 3,361,136 | 1/1968 | Turnbull | 130/30 |

Primary Examiner—A. F. Guida
Attorney—Noel G. Artman

ABSTRACT: A trash removal apparatus, for mounting on the upper end of a corn harvester elevator, having an upper knife roll and a lower contoured roll. The lower contoured roll has pads that cooperate with the knife roll for shearing the stalks and pockets that control the ears to prevent damage.

INVENTORS
RALPH L. SUTTON
LAWRENCE L. CORNELIUS
BY ATT'Y.

TRASH ROLLS FOR CORN HARVESTER

BACKGROUND OF THE INVENTION

1. Field of the Invention

The instant invention relates to corn harvesting apparatus and the like and more particularly to trash removal means for corn harvesters.

2. Description of the Prior Art

A conventional tractor mounted corn harvester includes a picking unit that functions to remove the ear of corn from the stalk. The severed ears of corn are then fed rearwardly through what is generally called a first elevator. The first elevator extends upwardly and rearwardly over the rear axle of the tractor and is located such that it discharges its material into a hopper or a corn processing unit. In a corn harvester of this type there is an occasional corn stalk harvested along with the severed ears and these stalks are fed along with the ears up the first elevator. Quite often there are ears of corn attached to these stalks. The conventional tractor mounted corn harvester includes a trash removal device located at the upper end of the first elevator that functions to separate the ears from the stalk and dispose of the stalk. The customary trash removal device comprises a pair or more of oppositely rotating rolls that function to pull the stalk through an in so doing, stripping the ear from the stalk. A tractor mounted corn harvester having a trash removal device such as this is disclosed in the patent to Turnbull U.S. Pat. No. 3,361,136 of Jan. 2, 1968. The prior art devices such as disclosed in the above referred to Turnbull patent have the disadvantage that in stripping the ear from the stalk the aggressive trash removal rolls have the potential to damage an ear of corn. When harvesting low moisture content corn for grain purposes this is not a serious disadvantage of the prior art devices, however, when harvesting sweet corn which has a higher moisture content and thus is more susceptible to damage the conventional trash removal devices are responsible for noticeable crop damage.

SUMMARY OF THE INVENTION

The general purpose of this invention is to provide a trash removal device which embraces all the advantages of similarly employed trash removal devices and possesses none of the aforedescribed disadvantages. To attain this the present invention contemplates a unique arrangement of an upper knife roll that cooperates with a lower contoured control roll along with a shield guarding the knife roll. Through the subject invention the shank connecting the ear to the stalk is severed by the knife roll thus permitting it to fall freely from the stalk. In moving the ear of corn into position to be severed the butt end of the ear is in engagement with the pocket formed on the control roll and the camming action of this pocket moves the ear away from the knife as the knife and anvil pad approach each other to thus diminish the possiblity of contact between the knife roll and the ear. It is not necessary to completely sever the shank since the unsevered increment will be broken as a result of the camming action. The adjustable shield covers the knife roll and its position relative to the roll determines the aggressiveness of the trash removal device. When the shield is adjusted towards its most aggressive position the possibility of ear damage increases and vice versa when the shield is adjusted to its least aggressive position the possibility of ear damage is minimized. The position of the shield will be dictated by the particular crop condition and the rate at which it is desired to traverse the field. It is an object of the invention to provide a trash disposal device that can be used to harvest sweet corn without damaging it.

DESCRIPTION OF THE PREFERRED EMBODIMENT

Figure 1:
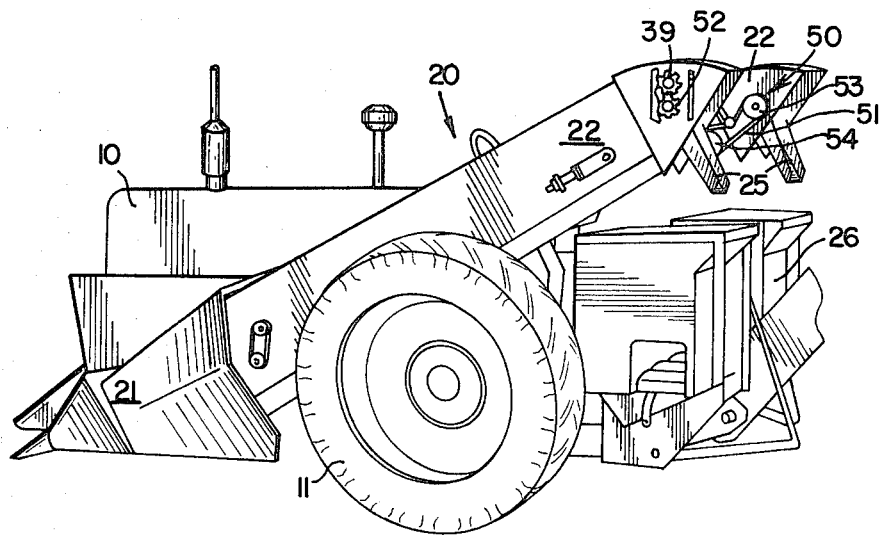
FIG. 1 is a perspective view of a tractor mounted corn harvester including the subject trash removal device.

Referring now to the drawings wherein like reference characters designate like or corresponding parts throughout the several views there is shown in FIG. 1 a tractor 10 having drive wheels 11. A corn harvester designated 20 is mounted upon the tractor and includes picking units 21 (only one of which is shown) and inclined elevators 22 extending upwardly and rearwardly over the tractor's rear axle. A processing unit 26 is carried by the tractor 10 and is positioned below the discharge ends of the inclined elevators 22 such that material discharged from the elevators 22 falls into the processing unit 26. As can be best seen in FIG. 2 the inclined elevators 22 include an overshot conveyor 23 having an upper discharge end 24.

A trash removal device 30 is carried on the upper end of each inclined elevator 22 and is located with respect to the upper discharge end 24 of the overshot conveyor 23 such that there is a gap 31 therebetween. The gap 31 is of a size such that a separated ear of corn cannot bridge across it, but rather will fall through it. The trash removal device 30 is located with respect to the overshot conveyor 23 such that when a stalk is conveyed up the inclined elevator 22 its leading end will come into contact with the trash removal device. Deflectors 25 are secured to the elevators 22 behind and below the trash removal devices 30 such that materials such as segments of stalk that pass through the trash removal device will be discharged to the ground rearwardly of the processing unit 26.

Figure 2:
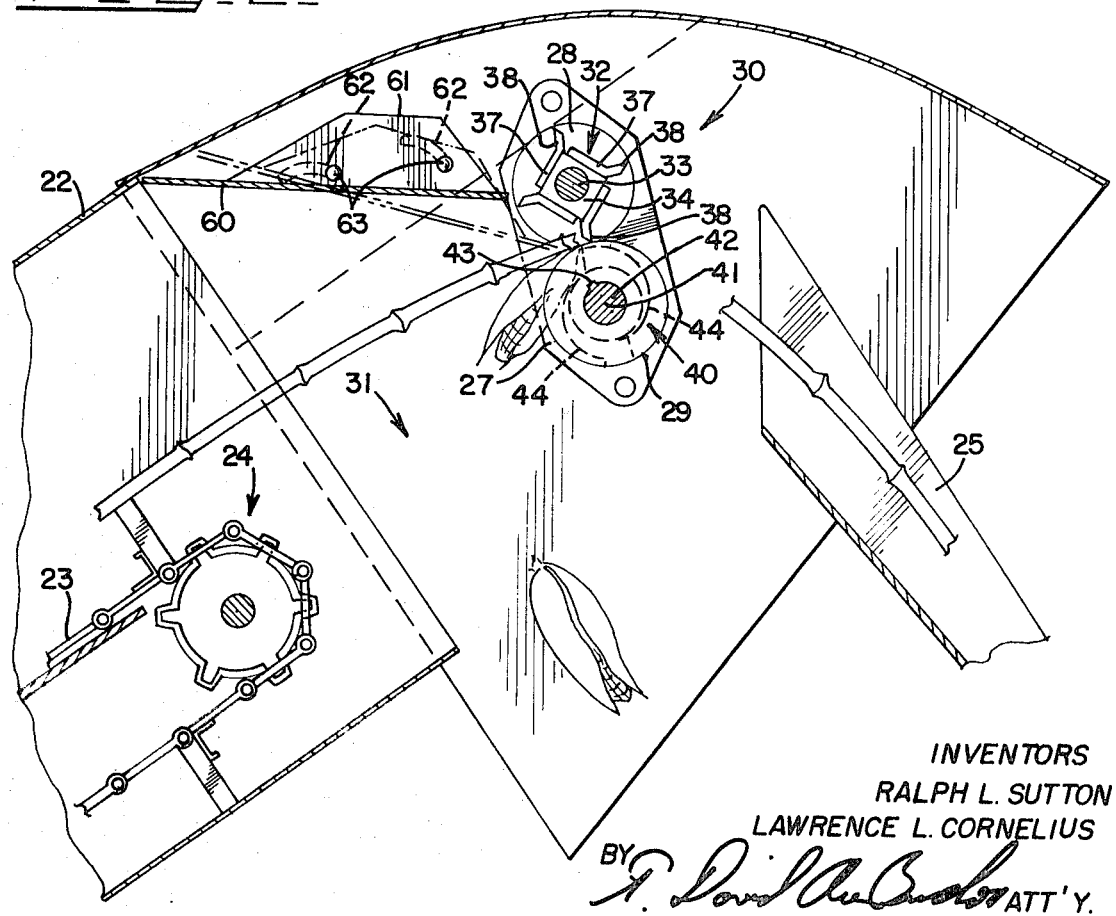
FIG. 2 is a cross-sectional view of the upper end of the first elevator showing the subject trash disposal device.

The trash removal device 30 includes a first elongated roll 32 having an axis 33. The roll 32 is made up of a shaft 34, and a plurality of blades 37. As illustrated in FIG. 2 the central portion of shaft 34 has a square cross section and four blades 37 are secured to the flat surface of the shaft. The blades 37 extend laterally across the inclined elevator 22 from one side to the other and has a sharpened elongated cutting edge 38. The blades 37 are secured to the shaft 34 by suitable means. A bearing support 27 is secured to each sidewall of the inclined elevator 22 and carries a bearing 28 for supporting the first elongated roll 32. As can be seen in FIG. 1 one end of the shaft 34 extends through the sidewall of the inclined elevator and has secured thereto a gear 39.

Figure 5:
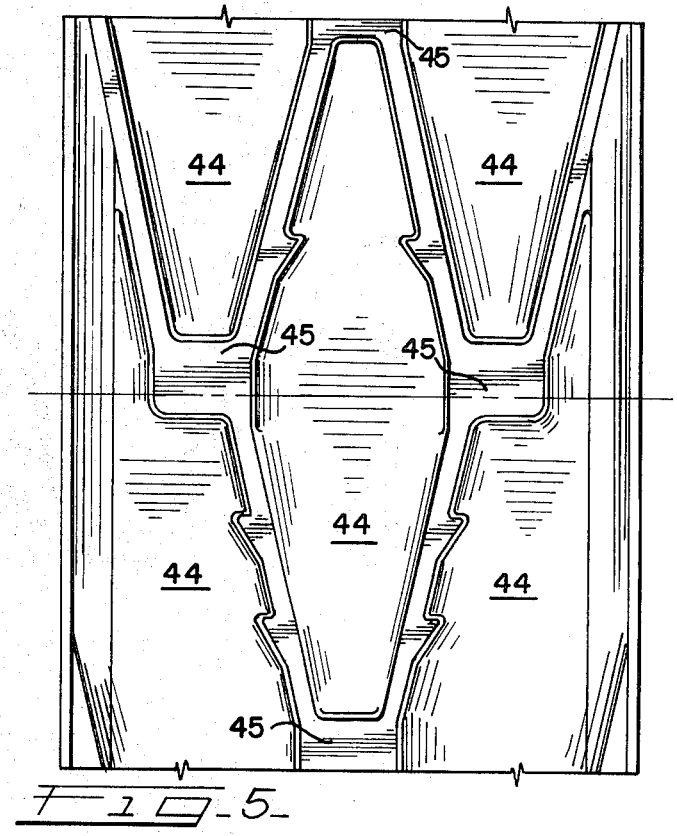
FIG. 5 is a development of the outer surface of the roll shown in FIG. 3.
Figure 3:
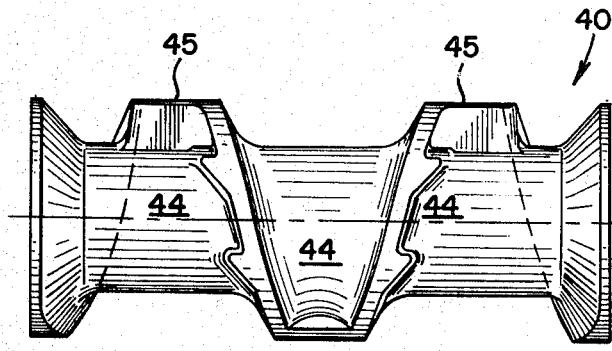
FIG. 3 is an isolated view of the contoured control roll.
Figure 4:
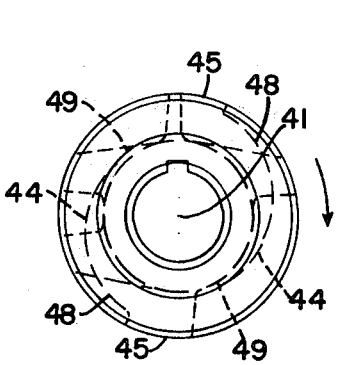
FIG. 4 is an end view of FIG. 3.

The trash removal device 30 further includes a second elongated roll 40 also referred to as the contoured control roll. The roll 40 is formed about an axis 41 and includes a shaft 42. The body portion of the roll is formed of a casting connected to the shaft 42 by a key 43. The casting has a contoured outer surface made up of a plurality of abutment surfaces 44 spaced axially across the roll. There is an anvil pad 45 corresponding to each of the abutment surfaces 44. As can be best seen in FIG. 5 the combination of an abutment surface 44 and an anvil pad 45 extend completely around the circumference of the second elongated roll 40. As also can be best seen in FIG. 5 the embodiment disclosed herein includes three abutment surfaces 44 each having an anvil pad 45. As can be best seen in FIG. 4 the anvil pad 45 is at a given radius from the roll axis and one end 48 of the abutment surface has a radius substantially equal to said given radius and joins at this point with its associated anvil pad. The other end 49 of the abutment surface has a radius substantially less than said given radius and the radius of the abutment surface progressively diminishes from said one end 48 to said other end 49. The bearing support 27 carries a bearing 29 in which the second elongated roll 40 is mounted. As can be seen in FIG. 1 one end of the shaft 42 extends through the sidewall of the inclined elevator and has a gear 52 secured thereto. Gear 52 meshes with gear 39 to thus coordinate the rotation of the first elongated roll 32 with the second elongated roll 40. As can be seen in FIG. 1 shaft 42 also extends through the other sidewall of the inclined elevator 22 and has a sprocket 53 secured thereto. The drive means 50 for the trash removal device includes the sprocket 53, a drive sprocket 54 and a connecting drive chain 51.

A shield or stripper plate 60 extends transversely of the inclined elevator 22 to thus protect the first elongated roll 32. Shield 60 has flanges 61 with arcuate slots 62 formed therein. Locking devices such as wing nuts 63 extend through apertures formed in the sidewalls of the inclined elevator 22 and through the arcuate slots 62. The shield 60 can be adjusted by loosening the locking devices 63 and rotating the shield, for example, from the full line position shown in FIG. 2 to the broken line position. The shield 60 would be located in the full line position as shown in FIG. 2 when an aggressive trash removal operation is required and in the broken line position when a mild trash removal operation is required. Of course, the shield 60 can be placed in any intermediate position depending upon the crop conditions.

It should be understood, of course, that the foregoing disclosure relates to a preferred embodiment of the invention and that numerous modifications or alterations may be made therein.

I claim:

1. In a corn harvester of the type including an inclined elevator for conveying detached ears of corn and stalks having ears attached thereto, said elevator including a conveyor terminating in an upper discharge end, wherein the improvement comprises:
   a trash removal device operatively associated with said elevator and located such that there is a gap between it and the upper discharge end of the conveyor, the gap being of such a size that the detached ear will fall through rather than bridge across it,
   said trash removal device including a first elongated roll mounted for rotation about its axis, said first roll having a plurality of elongated cutting edges substantially parallel to its axis;
   a second elongated roll mounted for rotation about its axis, the outer surface of said second roll being contoured such that there are a plurality of abutment surfaces spaced axially across the roll;
   an anvil pad associated with each of said abutment surfaces, said anvil pad spaced a given radius from the roll axis;
   each of said abutment surfaces joined at one end to its associated anvil pad, the other end of said abutment surface having a radius substantially less than said given radius and the abutment surface having a progressively diminishing radius from one end to said other end;
   each of said abutment surfaces having a pair of radially protruding guides that converge towards the anvil pad; and
   said first and second elongated rolls being mounted with respect to each other such that upon rotation of said rolls there is a shearing action between said elongated cutting edges and said anvil pad.

2. The invention as set forth in claim 1 wherein said trash removal device includes a shield mounted on said elevator for guarding said first elongated roll.

3. The invention as set forth in claim 2 wherein said shield includes a trailing edge parallel to said elongated cutting edges.

4. The invention as set forth in claim 2 wherein said shield is adjustably mounted with respect to said first elongated roll.

5. The invention as set forth in claim 3 wherein said shield is adjustably mounted with respect to said first elongated roll.

6. The invention as set forth in claim 1 wherein said first and second elongated roll carry intermeshed gears which coordinate their rotation such that there is an elongated cutting edge in shearing relationship with each anvil pad, and means for rotating one of said elongated rolls.

7. The invention as set forth in claim 6 wherein said trash removal device includes a shield mounted on said elevator for guarding said first elongated roll.

8. The invention as set forth in claim 7 wherein said shield includes a trailing edge parallel to said elongated cutting edges.

9. The invention as set forth in claim 7 wherein said shield is adjustably mounted with respect to said first elongated roll.

10. The invention as set forth in claim 8 wherein said shield is adjustably mounted with respect to said first elongated roll.